United States Patent
Hruska et al.

(10) Patent No.: US 9,680,711 B2
(45) Date of Patent: Jun. 13, 2017

(54) METHOD AND APPARATUS FOR VISUALIZING DYNAMIC-HOST-CONFIGURATION-PROTOCOL SCOPES

(71) Applicant: SOLARWINDS WORLDWIDE, LLC, Austin, TX (US)

(72) Inventors: Ondrej Hruska, Košice (SK); Jennifer Elizabeth Jobst, Sunset Valley, TX (US)

(73) Assignee: SOLARWINDS WORLDWIDE, LLC, Austin, TX (US)

( * ) Notice: Subject to any disclaimer, the term of this patent is extended or adjusted under 35 U.S.C. 154(b) by 263 days.

(21) Appl. No.: 14/092,061

(22) Filed: Nov. 27, 2013

(65) Prior Publication Data

US 2015/0149911 A1    May 28, 2015

(51) Int. Cl.
| | | |
|---|---|---|
| G06F 3/0481 | (2013.01) | |
| H04L 12/24 | (2006.01) | |
| H04L 29/12 | (2006.01) | |

(52) U.S. Cl.
CPC ............ *H04L 41/22* (2013.01); *G06F 3/0481* (2013.01); *H04L 61/2007* (2013.01); *H04L 61/2015* (2013.01); *H04L 61/2061* (2013.01)

(58) Field of Classification Search
CPC .... H04L 41/22; H04L 61/2007; G06F 3/0481
See application file for complete search history.

(56) References Cited

U.S. PATENT DOCUMENTS

| | | | | |
|---|---|---|---|---|
| 8,862,725 B1 * | 10/2014 | Voltmer | ............. | H04L 61/2007 370/352 |
| 8,862,735 B1 * | 10/2014 | Singh | ................. | H04L 61/1511 709/221 |
| 9,069,774 B1 * | 6/2015 | Ansari | ............... | G06F 11/3006 |
| 2004/0056888 A1 | 3/2004 | Fujinuma | | |
| 2007/0097992 A1 | 5/2007 | Singh et al. | | |
| 2008/0244054 A1 | 10/2008 | Schomp | | |
| 2009/0037847 A1 * | 2/2009 | Achtermann | ..... | H04L 29/12283 715/833 |

(Continued)

FOREIGN PATENT DOCUMENTS

| | | |
|---|---|---|
| EP | 2 369 815 A1 | 9/2011 |
| JP | 2005-033251 | 2/2005 |
| JP | 2012-070042 A | 4/2012 |

OTHER PUBLICATIONS

Infoblox IP Address Management Visibility, Control and Automation; Whitepaper; Infoblox Control Your Network; May 2013, 18 pages.

(Continued)

*Primary Examiner* — Jeanette J Parker
(74) *Attorney, Agent, or Firm* — Squire Patton Boggs (US) LLP

(57) ABSTRACT

A method and apparatus can be configured to determine that a first range of internet protocol addresses corresponds to a first scope. The method can also include displaying a first visual representation of the first scope. The first visual representation includes a first displayed bar. The length of the first displayed bar represents the span of the first scope. Each internet protocol address of the first scope has a representative position within the first displayed bar.

12 Claims, 5 Drawing Sheets

(56) References Cited

U.S. PATENT DOCUMENTS

2012/0131197 A1   5/2012   Prentice et al.

OTHER PUBLICATIONS

Singapore Search Report and Written Opinion application No. 10201407531Q dated Jul. 31, 2015.
Network Basics for Windows 2000, Windows 2000 network structuring; Japan; ASCII Corporation; Dec. 31, 2000; pp. 118-123.
Japan Patent Office, Office Action for corresponding Patent Appln. No. JP 2014-237468, Feb. 23, 2016.
Japanese Notice of Allowance for corresponding Japanese Patent Application No. 2014-237468, dated Jun. 7, 2016.
Singapore Office Action for corresponding Singapore Patent Application No. 10201407531Q, dated Apr. 11, 2016.
European Search Report application No. 14194440.5 dated Apr. 23, 2015.

* cited by examiner

METHOD AND APPARATUS FOR VISUALIZING DYNAMIC-HOST-CONFIGURATION-PROTOCOL SCOPES

BACKGROUND

Field

Embodiments of the invention relate to visualizing dynamic-host-configuration-protocol scopes.

Description of the Related Art

Dynamic-host-configuration protocol (DHCP) is a protocol that can be used to configure internet-protocol (IP) addresses of client devices. For example, a DHCP server can use DHCP to assign IP addresses to client devices that are served by the DHCP server. The DHCP server can configure certain ranges of IP addresses as IP addresses to be used by the client devices. A range of IP addresses to be used by the client devices can be considered to be a DHCP scope.

SUMMARY

According to a first embodiment, a method may include determining that a first range of internet protocol addresses corresponds to a first scope. The method may also include displaying a first visual representation of the first scope. The first visual representation comprises a first displayed bar. The length of the first displayed bar represents the span of the first scope. Each internet protocol address of the first scope has a representative position within the first displayed bar.

In the method of the first embodiment, the determining includes determining that a range of internet protocol addresses corresponds to a dynamic-host-configuration-protocol scope.

In the method of the first embodiment, a portion of the first displayed bar is a visual representation of excluded addresses of the first scope.

In the method of the first embodiment, the method can also include displaying a list of at least one scope that is related to the first scope.

In the method of the first embodiment, the method can also include determining that a second range of internet protocol addresses corresponds to a second scope. The method can also include displaying a second visual representation of the second scope. The second visual representation comprises a second displayed bar. The length of the second displayed bar represents the span of the second scope. Each internet protocol address of the second scope has a representative position within the second displayed bar.

In the method of the first embodiment, the method can also include determining that a third range of internet protocol addresses corresponds to a range of internet protocol addresses that are common to the first scope and the second scope. The method can also include displaying a third visual representation of the third range. The third visual representation comprises a third displayed bar. The length of the third displayed bar represents the span of the third range. Each internet protocol address of the third range has a representative position within the third displayed bar.

According to a second embodiment, an apparatus may include at least one processor. The apparatus may also include at least one memory including computer program code. The at least one memory and the computer program code may be configured, with the at least one processor, to cause the apparatus at least to determine that a first range of internet protocol addresses corresponds to a first scope. The apparatus may also be caused to display a first visual representation of the first scope. The first visual representation comprises a first displayed bar. The length of the first displayed bar represents the span of the first scope. Each internet protocol address of the first scope has a representative position within the first displayed bar.

In the apparatus of the second embodiment, the determining can include determining that a range of internet protocol addresses corresponds to a dynamic-host-configuration-protocol scope.

In the apparatus of the second embodiment, a portion of the first displayed bar is a visual representation of excluded addresses of the first scope.

In the apparatus of the second embodiment, the apparatus may be further caused to display a list of at least one scope that is related to the first scope.

In the apparatus of the second embodiment, the apparatus may be further caused to determine that a second range of internet protocol addresses corresponds to a second scope. The apparatus may be further caused to display a second visual representation of the second scope. The second visual representation comprises a second displayed bar. The length of the second displayed bar represents the span of the second scope. Each internet protocol address of the second scope has a representative position within the second displayed bar.

In the apparatus of the second embodiment, the apparatus is further caused to determine that a third range of internet protocol addresses corresponds to a range of internet protocol addresses that are common to the first scope and the second scope. The apparatus is further caused to display a third visual representation of the third range. The third visual representation comprises a third displayed bar. The length of the third displayed bar represents the span of the third range. Each internet protocol address of the third range has a representative position within the third displayed bar.

According to a third embodiment, a computer program product can be embodied on a non-transitory computer readable medium. The computer program product can be configured to control a processor to perform a process. The process may include determining that a first range of internet protocol addresses corresponds to a first scope. The process may also include displaying a first visual representation of the first scope. The first visual representation comprises a first displayed bar. The length of the first displayed bar represents the span of the first scope. Each internet protocol address of the first scope has a representative position within the first displayed bar.

In the computer program product of the third embodiment, the determining comprises determining that a range of internet protocol addresses corresponds to a dynamic-host-configuration-protocol scope.

In the computer program product of the third embodiment, a portion of the first displayed bar is a visual representation of excluded addresses of the first scope.

In the computer program product of the third embodiment, the process further includes displaying a list of at least one scope that is related to the first scope.

In the computer program product of the third embodiment, the process further includes determining that a second range of internet protocol addresses corresponds to a second scope. The process may also include displaying a second visual representation of the second scope. The second visual representation comprises a second displayed bar. The length of the second displayed bar represents the span of the second scope. Each internet protocol address of the second scope has a representative position within the second displayed bar.

In the computer program product of the third embodiment, the process can also include determining that a third range of internet protocol addresses corresponds to a range of internet protocol addresses that are common to the first scope and the second scope. The process can also include displaying a third visual representation of the third range. The third visual representation comprises a third displayed bar. The length of the third displayed bar represents the span of the third range. Each internet protocol address of the third range has a representative position within the third displayed bar.

BRIEF DESCRIPTION OF THE DRAWINGS

For proper understanding of the invention, reference should be made to the accompanying drawings, wherein.

DETAILED DESCRIPTION

Figure 1:
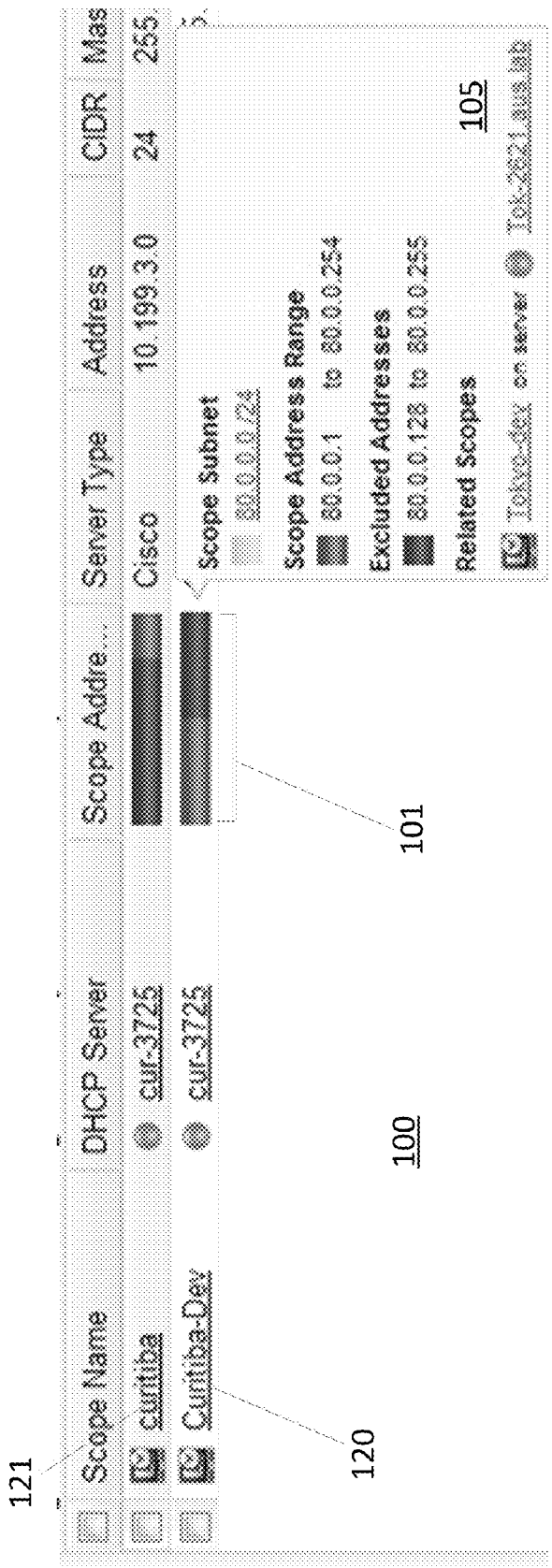
FIG. 1 illustrates a user interface for visualizing DHCP scopes in accordance with one embodiment.

Embodiments of the present invention relate to visualizing dynamic-host-configuration-protocol scopes. A DHCP server can maintain a plurality of IP addresses, and the DHCP server can decide what to do with each of the IP addresses. For example, the DHCP server can reserve certain IP addresses for dedicated purposes, such as for use by dedicated servers (such as a printer server or an e-mail server, for example). For the IP addresses that have not been reserved, the DHCP server can loan these IP addresses to new client devices that request a connection to the DHCP server. A DHCP server can organize its IP addresses according to DHCP scopes. The DCHP server can designate a scope as comprising of IP addresses that are grouped according to some purpose. A scope can be split into smaller scopes (i.e., split into sub-scopes of the original scope).

As described above, a DHCP scope can comprise of a range of IP addresses that have been assigned some designation by a DHCP administrator, for example. If the DHCP server assigns an IP address to a client device, the client device can use the IP address as its network address to communicate with other networked devices. Client devices can include, but are not limited to, laptop computers, desktop computers, smart phones, portable computing devices, servers, and printers, for example. A DHCP scope can also have an associated lease duration value that corresponds to a duration of time that a client device can use an assigned IP address that is within the DHCP scope.

The previous approaches of managing scopes (such as the approaches used by Microsoft Windows™) allow a user to split scopes. However, when using the previous approaches, users cannot readily determine which scopes have been split and how each scope relates to other scopes. Specifically, according to the previous approaches, if a scope has been split, a user cannot readily ascertain that the split has occurred because there is generally no trace/record of the split. According to the previous approaches, even if two scopes are related, a user cannot readily ascertain that the relationship exists because there is generally no trace/record of the relationship between scopes. Further, when using the previous approaches, a user may have difficulty visualizing which IP addresses are included within a particular scope. Further, when using the previous approaches, a user would not be able to readily determine whether two different scopes overlap. If two different scopes overlap, it is possible for an IP address (that is common to both scopes) to be assigned to two different devices, causing both devices to have intermittent connectivity problems. By readily determining whether two scopes overlap, a user can more readily identify and resolve these connectivity problems.

In contrast to the previous approaches, embodiments of the present invention can indicate which scopes are related. Further, embodiments of the present invention can visualize scopes. For example, certain embodiments of the present invention can visualize scopes by using displayed bars, as described in more detail below. By looking at the displayed bars, a user can more readily determine which IP addresses are included within a particular scope. Further, embodiments of the present invention can allow a user to readily determine whether different scopes overlap, as described in more detail below.

FIG. 1 illustrates a user interface for visualizing DHCP scopes in accordance with one embodiment. For example, user interface 100 shows "Curitiba" scope 121 and "Curitiba-Dev" scope 120. User interface 100 also shows different displayed bars which correspond to scope "Curitiba-Dev" 120 and scope "Curitiba" 121. For example, displayed bar 101 corresponds to a visualization of scope "Curitiba-Dev" 120. The length of displayed bar 101 represents the span of the scope/range. In one embodiment, each displayed bar 101 may be a constant length. Each IP address of scope "Curitiba-Dev" 120 has a representative position within displayed bar 101. The representative positions may be numerically ordered within displayed bar 101. Embodiments of the present invention can also display information about each scope in popups which appear when the user moves a pointer, such as a mouse, over bar 101. For example, user interface 100 can display information about each scope in a popup 105. By accessing popup 105, a user can see detailed information about "Curitiba-Dev" scope 120, for example. Popup 105 shows that "Curitiba-Dev" scope 120 comprises IP addresses within the "Scope Address Range" of 80.0.0.1 to 80.0.0.254, for a total of 254 addresses. Of the 254 addresses corresponding to "Curitiba-Dev" scope 120, some addresses of the scope may be designated as "excluded addresses." Excluded addresses are addresses that are within "Curitiba-Dev" scope 120, but the DHCP server generally will not assign the excluded addresses to requesting client devices. Referring again to FIG. 1, popup 105 shows that "Curitiba-Dev" scope 120 has "Excluded Addresses" ranging from 80.0.0.128 to 80.0.0.255. Excluded addresses 80.0.0.128 to 80.0.0.255 are visually represented by the dark-colored portion of bar 101. The dark-colored portion of bar 101 may be positioned and sized within displayed bar 101 according to where the excluded addresses exist within the overall range of scope 120. There can be multiple light-colored or dark-colored portions of bar 101 because multiple excluded address ranges can be defined. Additionally, popup 105 can show related scopes (such as related scope "Tokyo-dev"). Scope "Tokyo-dev" can be related to "Curitiba-dev" scope 120 because scope "Tokyo-dev" may include IP addresses that are also included in scope "Curitiba-dev." Two related scopes can have related IP addresses if: a) the scopes are on different physical networks that use the same private IP address range, or b) the scopes are on the same physical network but share an address range, either because of the way the scopes were defined by the DHCP administrator or because one of the scopes has been split.

Figure 2:
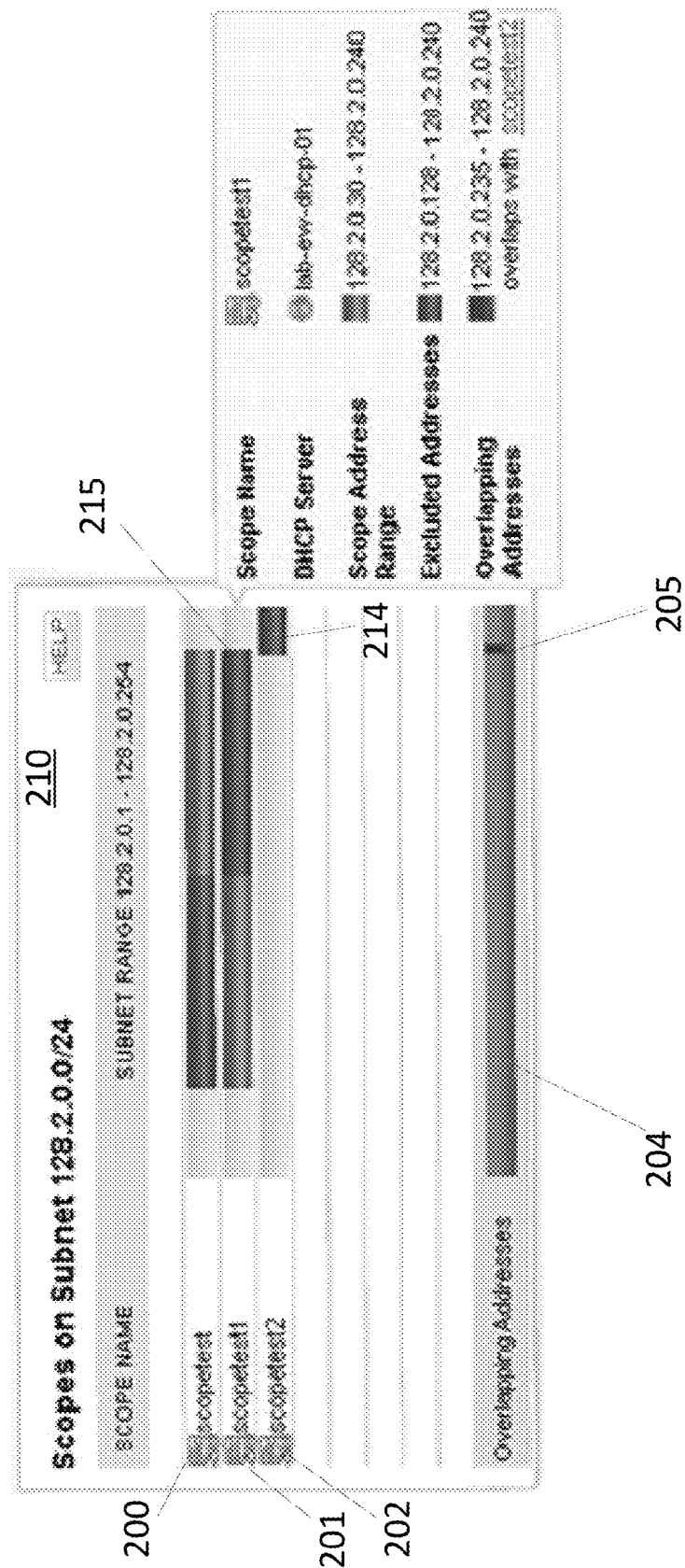
FIG. 2 illustrates another user interface for visualizing DHCP scopes in accordance with another embodiment.

FIG. 2 illustrates another user interface for visualizing DHCP scopes in accordance with another embodiment. FIG. 2 illustrates a user interface 210 that displays whether different scopes have overlapping addresses among them. In one embodiment, the overlapping different scopes both use a same scope subnet. FIG. 2 lists "scopetest" scope 200, "scopetest1" scope 201, and "scopetest2" scope 202. User interface 210 shows bar 204 that displays whether different scopes have overlapping addresses among them. Displayed bar 204 is a visualization of "Subnet Range 128.2.0.1-128.2.0.254," a visualization of 254 addresses. Similar to the displayed bars as described above, each of the addresses has a representative position within displayed bar 204. Displayed bar 204 can have a portion that is a visualization of a range of overlapping addresses between two scopes. For example, portion 205 of displayed bar 204 corresponds to and illustrates the overlap that exists between two scopes, the two scopes being represented by displayed bar 214 and displayed bar 215. Portion 205 illustrates that the overlapping range comprises addresses 128.2.0.235 to 128.2.0.240. By viewing user interface 210, a user can readily ascertain that there are overlapping scopes.

Because different scopes are generally designated for different purposes, the addresses corresponding to different scopes should not overlap. In other words, two different scopes should not have any common included IP addresses. It is generally very undesirable to have overlapping scopes because the IP addresses within the overlapping portions cannot be determined as belonging to a single scope. Therefore, it is possible for the same IP address to be used by two different devices, causing both devices to have intermittent connectivity issues/problems. Embodiments of the present invention can allow a user to readily determine whether scopes are overlapping.

Figure 3:
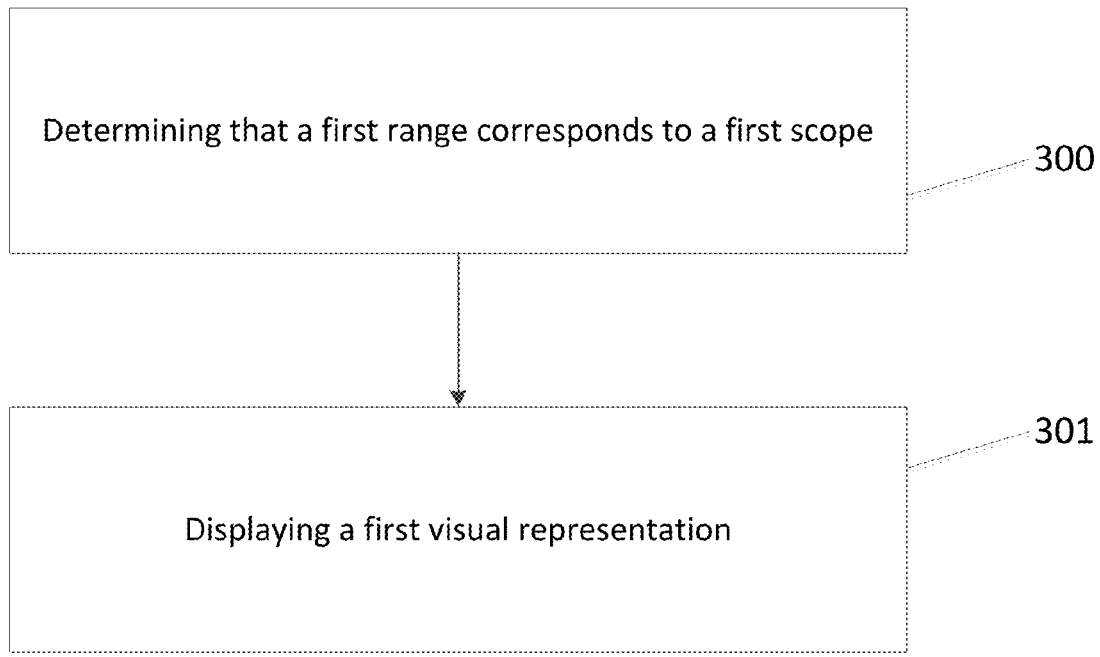
FIG. 3 illustrates a flowchart of a method in accordance with embodiments of the invention.

FIG. 3 illustrates a flowchart of a method in accordance with embodiments of the invention. The method illustrated in FIG. 3 includes, at 300, determining that a first range of internet protocol addresses corresponds to a first scope. The method also includes, at 301, displaying a first visual representation of the first scope. The first visual representation comprises a first displayed bar. The length of the first displayed bar represents the span of the first scope. Each internet protocol address of the first scope has a representative position within the first displayed bar.

Figure 4:
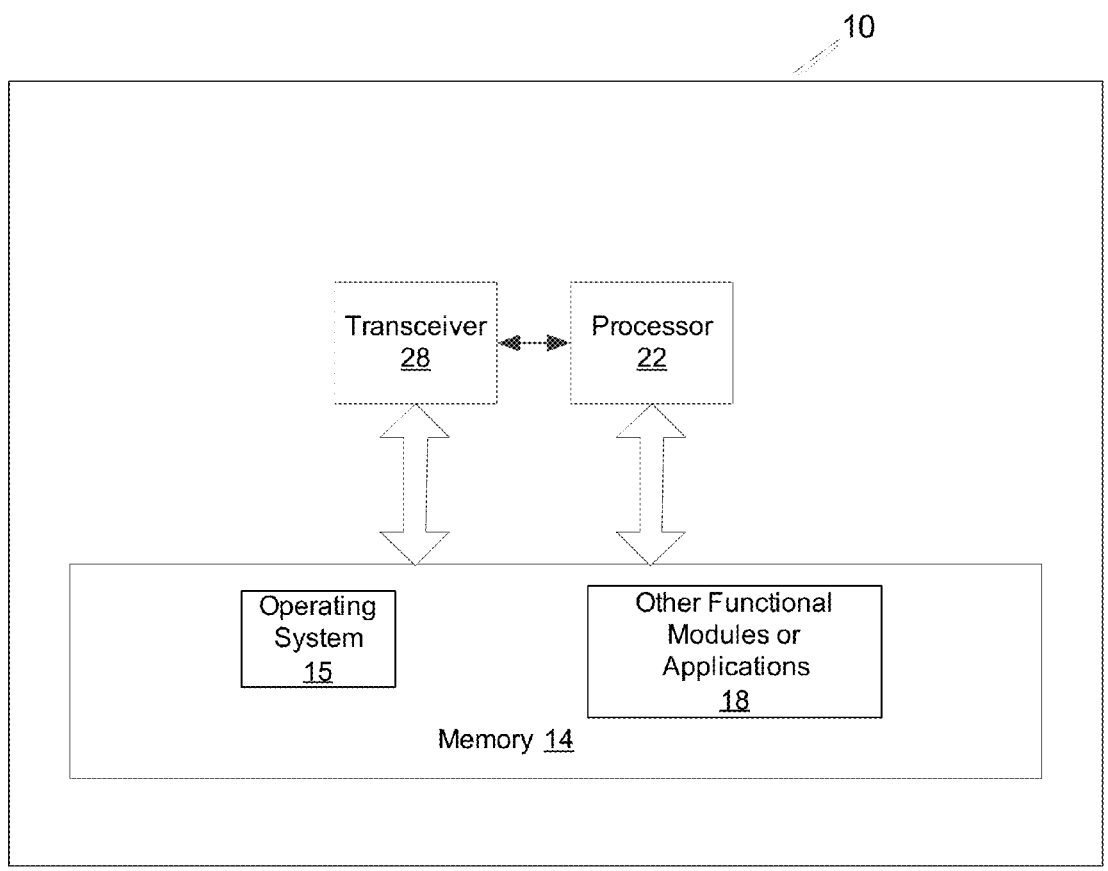
FIG. 4 illustrates an apparatus in accordance with embodiments of the invention.

FIG. 4 illustrates an apparatus in accordance with embodiments of the invention. In one embodiment, the apparatus can be a user terminal, a server device, or an administration server, for example. Apparatus 10 can include a processor 22 for processing information and executing instructions or operations. Processor 22 can be any type of general or specific purpose processor. While a single processor 22 is shown in FIG. 4, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 5:
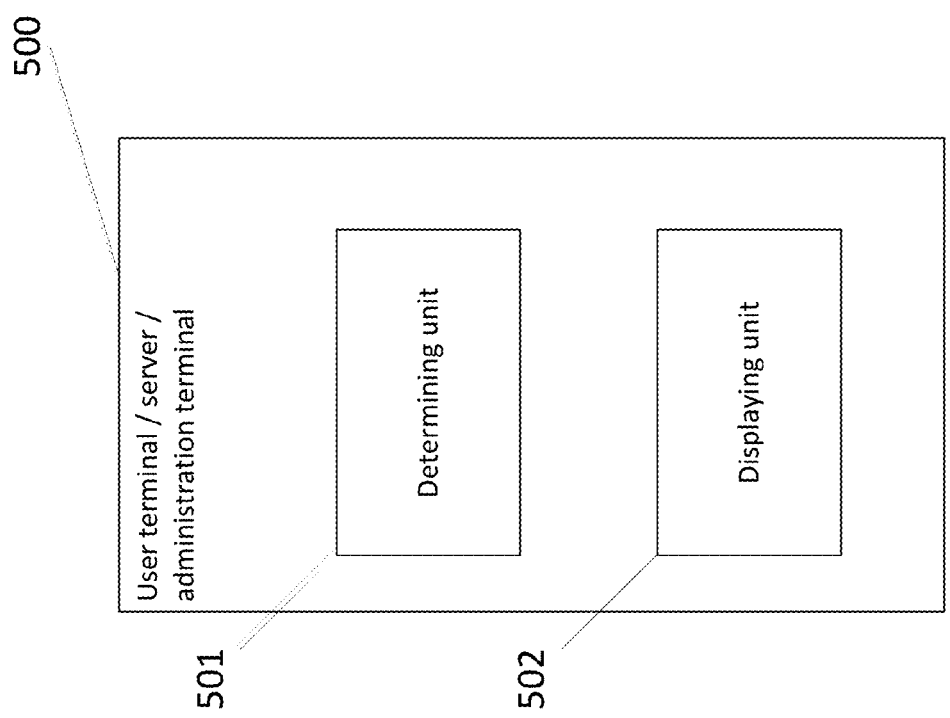
FIG. 5 illustrates an apparatus in accordance with embodiments of the invention.

FIG. 5 illustrates an apparatus in accordance with embodiments of the invention. Apparatus 500 can be a user terminal, a server device, or an administration terminal, for example. Apparatus 500 can include a determining unit 501 that determines that a first range of internet protocol addresses corresponds to a first scope. Apparatus 500 can also include a displaying unit 502 that displays a first visual representation of the first scope. The first visual representation comprises a first displayed bar. The length of the first displayed bar represents the span of the first scope. Each internet protocol address of the first scope has a representative position within the first displayed bar.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
   determining that a first range of internet protocol addresses corresponds to a first scope;
   displaying a first visual representation of the first scope, wherein the first visual representation comprises a first displayed bar, the length of the first displayed bar represents a span of the first range of the first scope, and each internet protocol address of the first scope has a representative position within the first displayed bar;
   determining that a second range of internet protocol addresses corresponds to a second scope;
   displaying a second visual representation of the second scope, wherein the second visual representation comprises a second displayed bar, the length of the second displayed bar represents a span of the second range of the second scope, and each internet protocol address of the second scope has a representative position within the second displayed bar;
   determining that a third range of internet protocol addresses corresponds to a range of internet protocol addresses that are common to the first scope and the second scope;
   displaying a third visual representation of the third range, wherein the third visual representation comprises a third displayed bar, the length of the third displayed bar represents a span of the third range, each internet protocol address of the third range has a representative position within the third displayed bar, and the third displayed bar is separate from the first and second displayed bar; and
   displaying an indication that a third scope is related to at least one of the first and second scopes,
   wherein the third scope is related to at least one of the first and second scopes because a scope has been split into the third scope and at least one of the first and the second scopes.

2. The method according to claim 1, wherein the determining that the first range of internet protocol addresses corresponds to the first scope comprises determining that a range of internet protocol addresses corresponds to a dynamic-host-configuration-protocol scope.

3. The method according to claim 1, wherein a portion of the first displayed bar is a visual representation of excluded addresses of the first scope.

4. The method according to claim 1, further comprising: displaying a list of at least one scope that is related to the first scope.

5. An apparatus, comprising:
   at least one processor; and
   at least one memory including computer program code,
   the at least one memory and the computer program code configured, with the at least one processor, to cause the apparatus at least to
   determine that a first range of internet protocol addresses corresponds to a first scope;
   display a first visual representation of the first scope, wherein the first visual representation comprises a first displayed bar, the length of the first displayed bar represents a span of the first range of the first scope, and each internet protocol address of the first scope has a representative position within the first displayed bar;
   determine that a second range of internet protocol addresses corresponds to a second scope;
   display a second visual representation of the second scope, wherein the second visual representation comprises a second displayed bar, the length of the second displayed bar represents a span of the second range of the second scope, and each internet protocol address of the second scope has a representative position within the second displayed bar;
   determine that a third range of internet protocol addresses corresponds to a range of internet protocol addresses that are common to the first scope and the second scope;
   display a third visual representation of the third range, wherein the third visual representation comprises a third displayed bar, the length of the third displayed bar represents a span of the third range, each internet protocol address of the third range has a representative position within the third displayed bar, and the third displayed bar is separate from the first and second displayed bar; and
   display an indication that a third scope is related to at least one of the first and second scopes,
   wherein the third scope is related to at least one of the first and second scopes because a scope has been split into the third scope and at least one of the first and the second scopes.

6. The apparatus according to claim 5, wherein the determining that the first range of internet protocol addresses corresponds to the first scope comprises determining that a range of internet protocol addresses corresponds to a dynamic-host-configuration-protocol scope.

7. The apparatus according to claim 5, wherein a portion of the first displayed bar is a visual representation of excluded addresses of the first scope.

8. The apparatus according to claim 5, wherein the apparatus is further caused to:
   display a list of at least one scope that is related to the first scope.

9. A computer program product, embodied on a non-transitory computer readable medium, the computer program product configured to control a processor to perform a process, comprising:
   determining that a first range of internet protocol addresses corresponds to a first scope;
   displaying a first visual representation of the first scope, wherein the first visual representation comprises a first displayed bar, the length of the first displayed bar represents a span of the first range of the first scope, each internet protocol address of the first scope has a representative position within the first displayed bar;
   determining that a second range of internet protocol addresses corresponds to a second scope;
   displaying a second visual representation of the second scope, wherein the second visual representation comprises a second displayed bar, the length of the second displayed bar represents a span of the second range of the second scope, and each internet protocol address of the second scope has a representative position within the second displayed bar;
   determining that a third range of internet protocol addresses corresponds to a range of internet protocol addresses that are common to the first scope and the second scope;
   displaying a third visual representation of the third range, wherein the third visual representation comprises a third displayed bar, the length of the third displayed bar represents a span of the third range, each internet protocol address of the third range has a representative position within the third displayed bar, and the third displayed bar is separate from the first and second displayed bar; and displaying an indication that a third scope is related to at least one of the first and second scopes, wherein the third scope is related to at least one of the first and second scopes because a scope has been split into the third scope and at least one of the first and the second scopes.

10. The computer program product according to claim 9, wherein the determining that the first range of internet protocol addresses corresponds to the first scope comprises determining that a range of internet protocol addresses corresponds to a dynamic-host-configuration-protocol scope.

11. The computer program product according to claim 9, wherein a portion of the first displayed bar is a visual representation of excluded addresses of the first scope.

12. The computer program product according to claim 9, wherein the process further comprises: displaying a list of at least one scope that is related to the first scope.

* * * * *